(12) United States Patent
Fourie (10) Patent No.: US 10,687,224 B2
(45) Date of Patent: Jun. 16, 2020

(54) SYSTEM AND METHOD FOR PROVIDING COMMUNICATIONS SERVICES ON BOTH SIDES OF A CORRIDOR

(71) Applicant: POYNTING ANTENNAS (PTY) LIMITED, Johannesburg (ZA)

(72) Inventor: Andries Petrus Cronje Fourie, Johannesburg (ZA)

(73) Assignee: POYNTING ANTENNAS (PTY) LIMITED, Johannesburg (ZA)

( * ) Notice: Subject to any disclaimer, the term of this patent is extended or adjusted under 35 U.S.C. 154(b) by 0 days.

(21) Appl. No.: 16/482,205

(22) PCT Filed: Jan. 22, 2018

(86) PCT No.: PCT/IB2018/050374
§ 371 (c)(1),
(2) Date: Jul. 30, 2019

(87) PCT Pub. No.: WO2018/142236
PCT Pub. Date: Aug. 9, 2018

(65) Prior Publication Data
US 2019/0349785 A1 Nov. 14, 2019

(30) Foreign Application Priority Data
Jan. 31, 2017 (ZA) ................................ 2017/00746

(51) Int. Cl.
*H04W 16/30* (2009.01)
(52) U.S. Cl.
CPC .................................. *H04W 16/30* (2013.01)

(58) Field of Classification Search
CPC .......... G08G 1/0965; H01Q 1/38; H04W 3/90
See application file for complete search history.

(56) References Cited

U.S. PATENT DOCUMENTS

| 6,222,503 | B1 | 4/2001 | Gietema et al. | |
| 9,843,911 | B2 * | 12/2017 | Barnes | H04W 4/90 |
| 2002/0167954 | A1 | 11/2002 | Highsmith et al. | |

(Continued)

FOREIGN PATENT DOCUMENTS

WO 2015/058210 A1 4/2015

OTHER PUBLICATIONS

International Search Report and Written Opinion for PCT/IB2018/050374, dated May 30, 2018.

*Primary Examiner* — Joshua L Schwartz
(74) *Attorney, Agent, or Firm* — Merchant & Gould P.C.

(57) ABSTRACT

A system 10 for providing communication services to user stations 14.1 to 14.*n* which are spaced on first and second opposed sides 16, 18 of an elongate corridor 12, comprises a first node 20 and a second node 22. The nodes drive respective radiation patterns comprising at least first, second, third and fourth lobes 30, 32, 34 and 36 having respective main axes 38, 40, 42 and 44. The arrangement is such that in respect of the second corridor node: main axis 38 is directed towards a first region 14.27 which is on the first side 16, to illuminate stations on the first side; main axis 40 is directed towards a second region 14.46 which is on the second side 18, to illuminate stations on the second side; main axis 42 is directed towards a third region 14.10 which is on the first side, to illuminate stations on the first side; and main axis 44 is directed towards a fourth region 14.63, to illuminate stations on the second side.

10 Claims, 7 Drawing Sheets

(56) References Cited

U.S. PATENT DOCUMENTS

2013/0257673 A1\* 10/2013 Wang ................. H01Q 1/38
  343/852
2017/0352268 A1\* 12/2017 Colella ............... G08G 1/0965

\* cited by examiner

SYSTEM AND METHOD FOR PROVIDING COMMUNICATIONS SERVICES ON BOTH SIDES OF A CORRIDOR

This application is a National Stage Application of PCT/IB2018/050374, filed Jan. 22, 2018, which claims benefit of Patent Application No. 2017/00746, filed Jan. 31, 2017 in South Africa, and which applications are incorporated herein by reference. To the extent appropriate, a claim of priority is made to each of the above-disclosed applications.

INTRODUCTION AND BACKGROUND

This invention relates to a communication system and to a method of providing communication services to a plurality of spaced user stations, such as houses and/or offices in a built-up area.

Fibre to the X (FTTX) is a known technology for the so-called last mile where optical fibre cables are provided between a distribution point and each of a plurality of end user stations in a built-up area. To provide these cables in a built-up area, such as suburb or the like, trenches need to be dug on both sides of a street to locate main fibre branches in the trenches. Connection points are provided at each user station along the length of each main branch, so that the user stations may be connected by fibre sub-branches to the main branch in the trench. It will be appreciated that the roll out of such a system is time and labour intensive, causes inconvenience to inhabitants and is also expensive.

OBJECT OF THE INVENTION

Accordingly, it is an object of the present invention to provide a system for and method of providing communications services to user stations in a built-up area with which the applicant believes the aforementioned disadvantages may at least be alleviated or which may provide a useful alternative for the known systems and methods.

SUMMARY OF THE INVENTION

According to the invention there is provided a system for providing communication services to user stations which are spaced on each of a first side and a second opposed side of an elongate corridor extending between an upstream region and a downstream region, the system comprising:
  at least a first corridor node and a second corridor provided in spaced relation along the corridor; the at least first and second corridor nodes comprising respective radio transceivers connected to associated antenna arrangements, the respective radio transceivers transmitting radio signals having a respective frequency band, the frequency band of the radio signals transmitted by the radio transceiver of the second corridor node at least partially coinciding with the frequency band of the radio signals transmitted by the first corridor node, and the respective antenna arrangements having respective radiation patterns comprising at least a first, a second, a third and a fourth elongate main lobe having respective main axes;
  the arrangement being such that in respect of the antenna arrangement of the second corridor node: the main axis of the first lobe is directed upstream towards a first region along the corridor which is on the first side of the corridor to illuminate user stations associated with the second corridor node between the first region and the second corridor node; the main axis of the second lobe is directed upstream towards a second region along the corridor which is on the second side of the corridor to illuminate user stations associated with the second corridor node between the second region and the second corridor node; the main axis of the third lobe is directed towards a third region along the corridor which is on the first side of the corridor intermediate the first and second corridor nodes to illuminate user stations associated with the second corridor node between the third region and the second corridor node; and the main axis of the fourth lobe is directed towards a fourth region along the corridor which is on the second side of the corridor intermediate the first and second corridor nodes to illuminate user stations associated with the second corridor node between the fourth region and the second corridor node; and
  a directional antenna at each user station and which antenna is aimed at the associated corridor node.

The term radiation pattern is used in this specification to refer to the directional (angular) dependence of the strength of the radio waves from the antenna or other source. The radiation pattern may be represented graphically as a plot of one of a number of related variables, including: the field strength (an amplitude pattern or field pattern), the power per unit solid angle (power pattern) and the directive gain.

It is a fundamental property of antennas that the receiving pattern (sensitivity as a function of direction) of an antenna when used for receiving is identical to the far-field radiation pattern of the antenna when used for transmitting. This is a consequence of the reciprocity theorem of electro-magnetics. Therefore, in references of radiation patterns below, the antenna can be viewed as either transmitting or receiving, whichever is more convenient.

The system may comprise at least the first corridor node, the second corridor node and a third corridor node provided sequentially in spaced relation along the corridor and the first and second regions may be intermediate the second and third corridor nodes.

The first lobe may illuminate user stations on the first side of the corridor and may be shaped such that gain is a maximum on the main axis of the first lobe and decreases progressively in a first angular direction (such as clockwise), the second lobe may illuminate user stations on the second side of the corridor and may be shaped such that gain is a maximum on the main axis of the second lob and decreases progressively in an opposite angular direction (such as anticlockwise), the third lobe may illuminate user stations on the first side of the corridor and may be shaped such that gain is a maximum on the main axis of the third lobe and decreases progressively in the opposite angular direction and the fourth lobe may illuminate user stations on the second side of the corridor and may be shaped such that gain is a maximum on the main axis of the fourth lobe and decreases progressively in the first angular direction.

At least some of the lobes may be asymmetrical about its respective main axis.

The first to fourth lobes of the second corridor node may further be shaped such that there are: a first at least partial null between the first and second lobes; and a second at least partial null between the third and fourth lobes, the first at least partial null may be directed at the third corridor node and the second at least partial null may be directed at the first corridor node.

Each corridor node may comprise a first part comprising a first radio transceiver connected to an associated antenna arrangement and a second part comprising a second radio transceiver connected to an associated antenna arrangement.

In some embodiments the first and second parts may be housed in a common enclosure and the first part may drive the first and second lobes with signals having the respective frequency band and the second part may drive the third and fourth lobes with signals having the same frequency band.

In a presently preferred embodiment, the first part and second part are split and the first part is mounted on the first side of the corridor and drives the second and fourth lobes and the second part is mounted on the second side of the corridor and drives the first and third lobes.

The first and second parts may be mounted directly opposite one another and the spacing between the first and second parts is preferably as large as practically possible.

According to another aspect of the invention these is provided a method of providing communication services to user stations which are spaced on each of a first side and a second opposed side of an elongate corridor extending between an upstream region and a downstream region, the method comprising:

using at least a first corridor node and a second corridor node provided in spaced relation along the corridor; the at least first and second corridor nodes comprising respective radio transceivers connected to associated antenna arrangements, the respective radio transceivers transmitting radio signals in a respective frequency band having a respective bandwidth, the frequency band of the radio signals transmitted by the radio transceiver of the second corridor node at least partially coinciding with the frequency band of the radio signals transmitted by the first corridor node, and the respective antenna arrangements having respective radiation patterns comprising at least a first, a second, a third and a fourth elongate main lobe having respective main axes;

directing in respect of the antenna arrangement of the second corridor node: the main axis of the first lobe upstream towards a first region along the corridor which is on the first side of the corridor to illuminate user stations associated with the second corridor node between the first region and the second corridor node; the main axis of the second lobe upstream towards a second region along the corridor which is on the second side of the corridor to illuminate user stations associated with the second corridor node between the second region and the second corridor node; the main axis of the third lobe downstream towards a third region along the corridor which is on the first side of the corridor intermediate the first and second corridor nodes to illuminate user stations associated with the second corridor node between the third region and the second corridor node; and the main axis of the fourth lobe downstream towards a fourth region along the corridor which is on the second side of the corridor intermediate the first and second corridor nodes to illuminate user stations associated with the second corridor node between the fourth region and the second corridor node; and at each user station, utilizing a directional antenna which is aimed at the associated corridor node, to communicate with the associated corridor node.

BRIEF DESCRIPTION OF THE
ACCOMPANYING DIAGRAMS

The invention will now further be described, by way of example only, with reference to the accompanying diagrams wherein.

DESCRIPTION OF A PREFERRED
EMBODIMENT OF THE INVENTION

Figure 1:
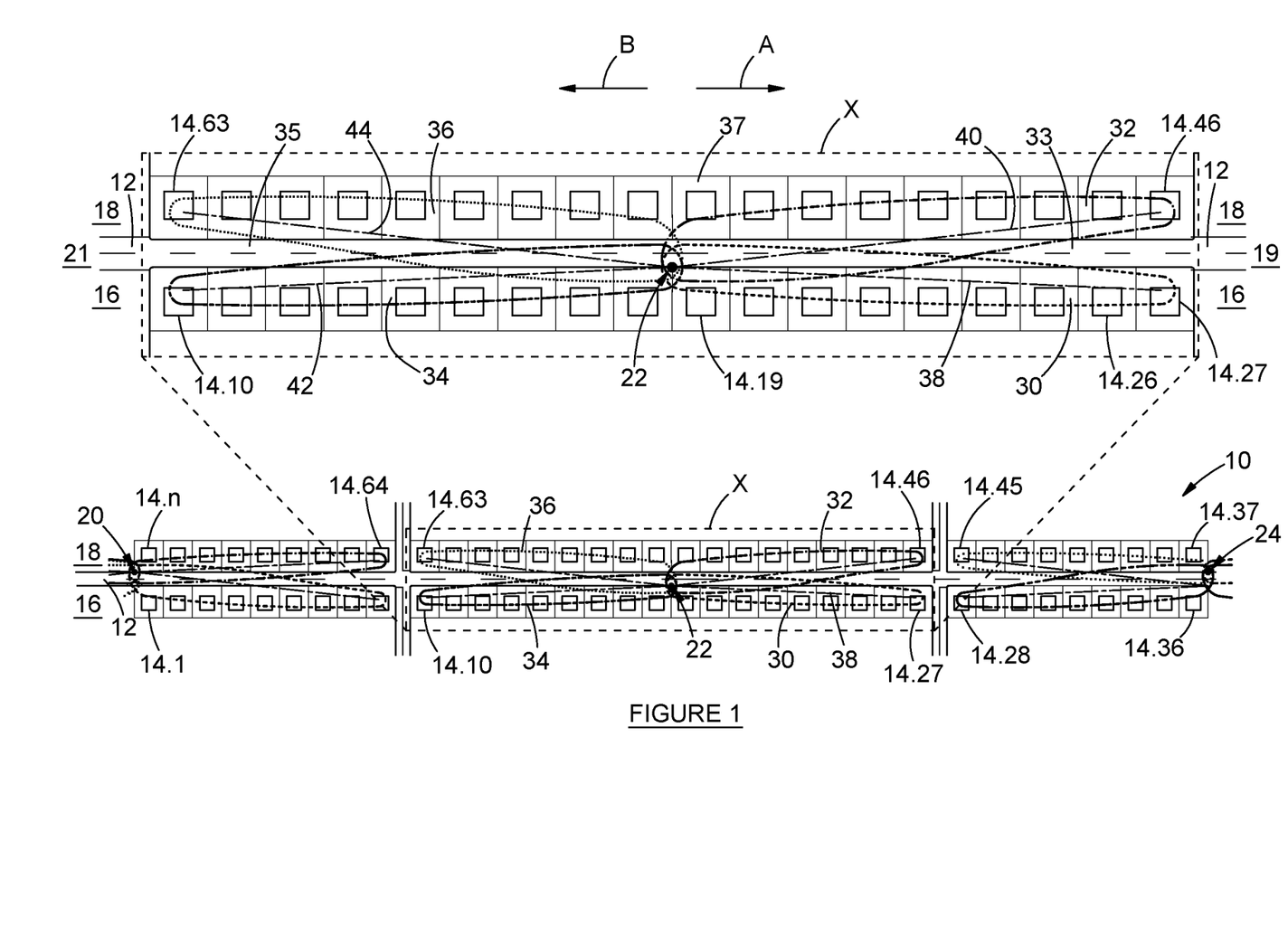
FIG. 1 is a diagrammatic representation of a first example embodiment of a system for providing communication services to a plurality of user stations along a corridor, wherein a part of the system is enclosed a by a rectangle in broken lines marked X and wherein the part of the system in the rectangle X is enlarged for better clarity.

A system for providing communication services to user stations which are spaced along a corridor is generally designated by the reference numeral 10 in FIG. 1.

In the example embodiment, the corridor is a suburban street 12 and the user stations are houses 14.1 to 14.$n$ which are spaced on each of a first side 16 and a second opposed side 18 of the street. The corridor has an upstream region 19 and a downstream region 21 and may be any suitable channel or passage, including but not limited to a path, street, road etc.

In the example embodiment, the system comprises at least a first corridor node 20, a second corridor node 22 and a third corridor node 24 provided sequentially in spaced relation along the street. The at least first, second and third corridor nodes comprise respective radio transceivers (such as 54 and/or 56, 62 and/or 64 shown in FIG. 5) connected to associated antenna arrangements 58, 60, 66 and 68 (also shown in FIG. 5). The radio transceivers transmit signals having a respective frequency band which band may be the same for both WiFi and/or LTE transceivers.

Referring again to FIG. 1, the respective antenna arrangements have radiation patterns comprising at least a first 30, a second 32, a third 34 and a fourth 36 elongate main lobe having respective main axes 38, 40, 42 and 44. The arrangement is such that in respect of the antenna arrangement of the second corridor node, the main axis 38 of the first lobe 30 is directed upstream in a first general direction A along the street towards a first region 14.27 which is on the first side 16 of the street intermediate the second corridor node 22 and the third corridor node 24, the main axis 40 of the second lobe 32 is directed upstream in the first direction A along the street towards a second region 14.46 which is on the second side 18 of the street intermediate the second corridor node 22 and third corridor node 24, the main axis 42 of the third lobe 34 is directed downstream in an opposite general direction B along the street towards a third region 14.10 which is on the first side 16 of the street intermediate the first corridor node 20 and the second corridor node 22 and the main axis 44 of the fourth lobe 36 is directed downstream in the opposite direction B along the street towards a fourth region 14.63 which is on the second side 18 of the street intermediate the first corridor node 20 and the second corridor node 22.

Hence, each of the corridor nodes 20, 22, 24 provides two directional lobes in each of the general first direction A and the opposite direction B along the street 12. The arrangement is preferably such that the houses along the street are illuminated approximately uniformly, by ensuring the highest gain (on the main axis of a lobe) is in the direction of the house furthest from the corridor node and with lower gain to houses closer to the corridor node. As an example, and referring to FIGS. 1 and 2, lobe 30 associated with corridor node 22 has main axis 38. The main axis 38 is directed at house 14.27 on the first side 16 of the street and furthest away from corridor node 22. Houses 14.26 to 14.19 which are progressively closer to corridor node 22 on the first side 16 of the street, are illuminated with progressively lesser gain. Hence, the lobes are shaped such that the gain is high in the direction of the furthest house and progressively decreases in the direction of closer houses. The decrease may be in relation to distance from the corridor node, so that substantially the same or an equal signal level is received at each of the houses 14.19 to 14.27 illuminated or served by the lobe.

In addition to shaping the lobes as above, the radiation patterns are also shaped to ensure low gain in the direction of adjacent or neighbouring corridor nodes 20 and 24 of the system 10. In the context, low gain means gain values which would not degrade the performance of the adjacent corridor nodes 20 and 24 by interfering with the adjacent station. In the example embodiment of FIG. 1, there is a first at least partial null 33 between the first lobe 30 and the second lobe 32, a second at least partial null 35 between the third lobe 34 and the fourth lobe 36 and a third at least partial null 37 between the second lobe 32 and the fourth lobe 36. The first null 33 is directed at the third corridor node 24 and the second null 35 is directed at the first corridor node 20.

Figure 2:
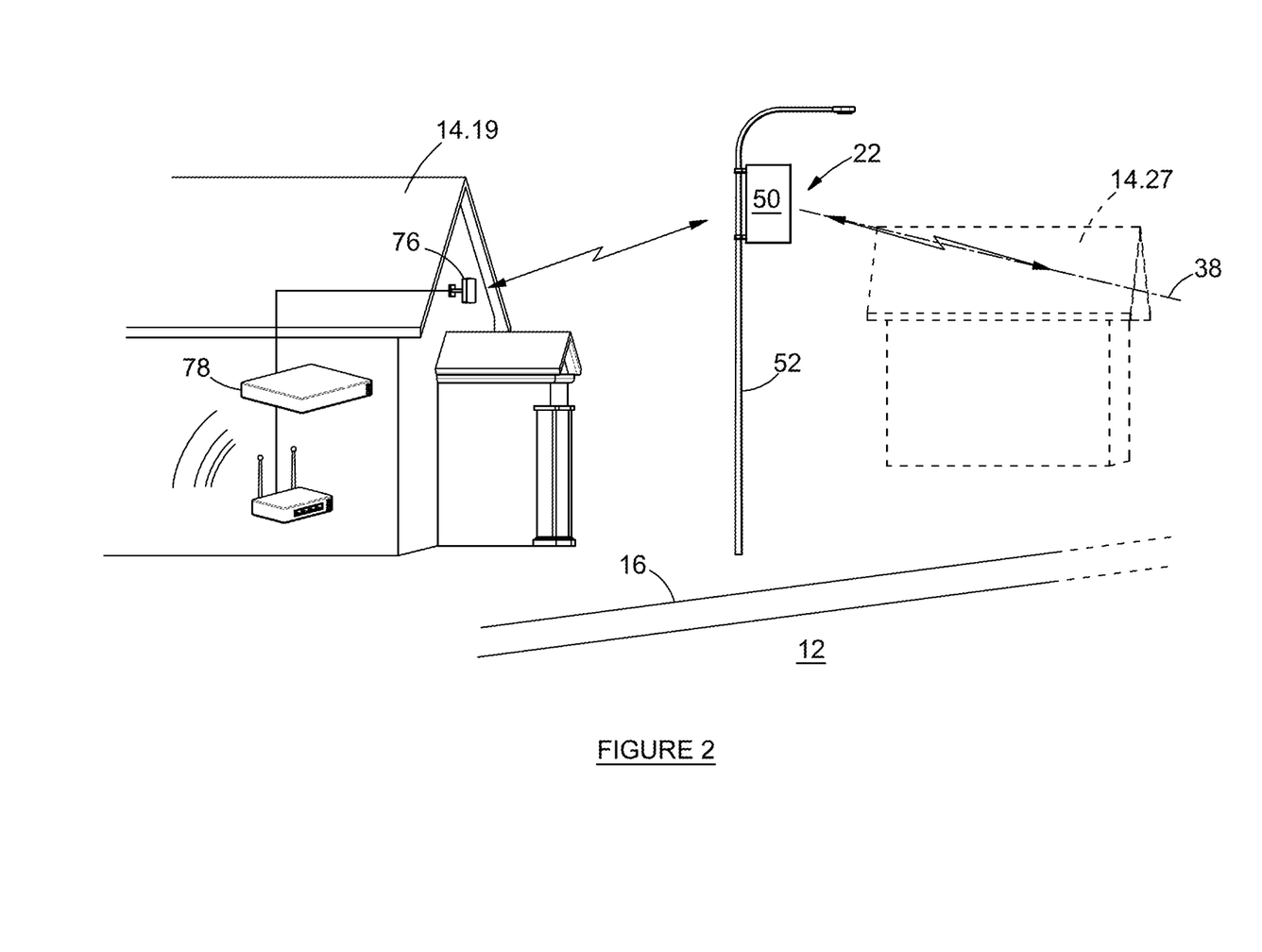
FIG. 2 is a diagrammatic representation of a data communication path between a corridor node of the system and a house.
Figure 5:
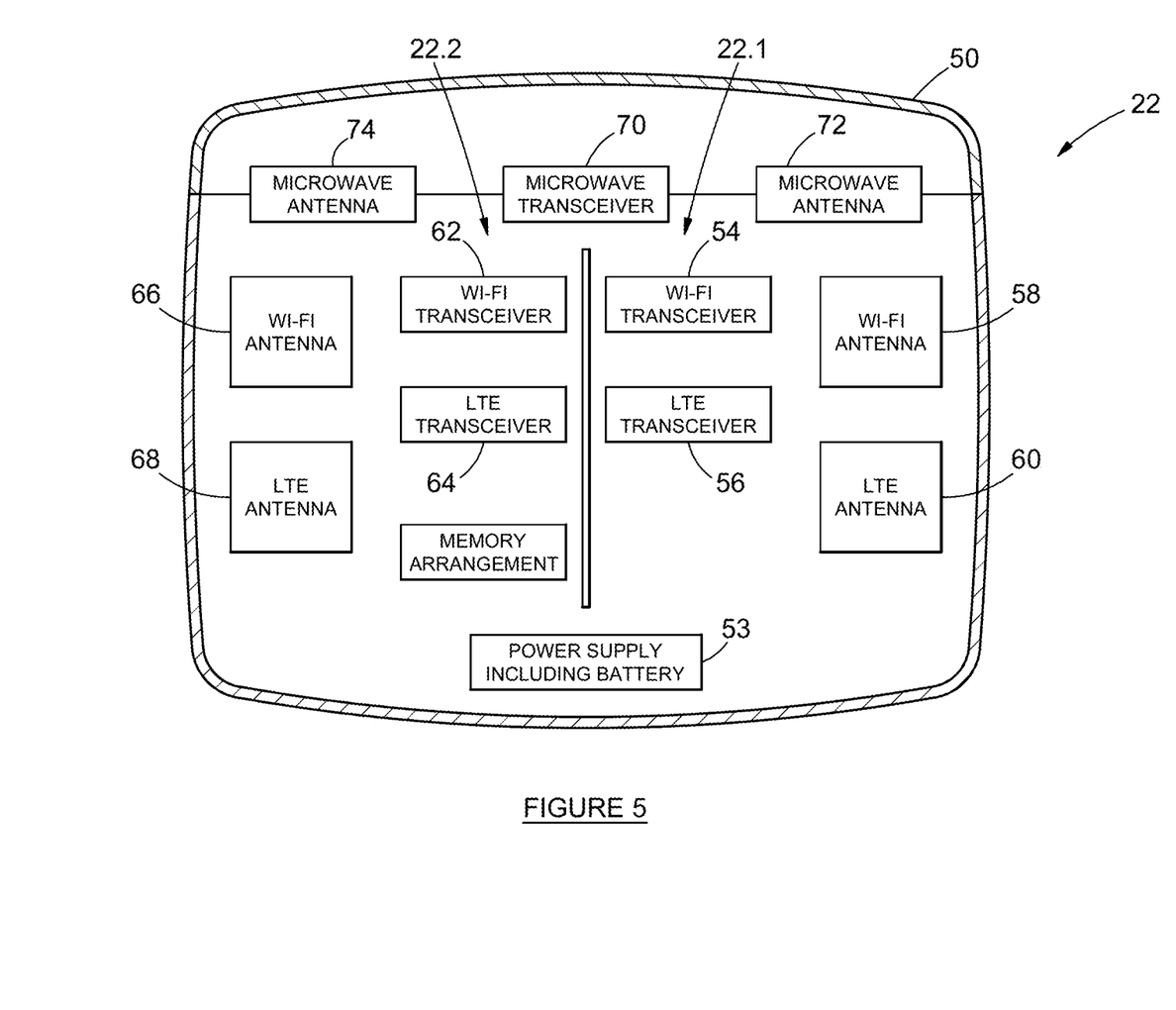
FIG. 5 is a basic block diagram of a corridor node forming part of the system.

Corridor nodes 22 to 24 may be similar in configuration. Referring to FIG. 2, in a first example embodiment, the corridor node 22 comprises an enclosure 50 mounted on a lamp post 52 on the first side 16 of the street 12. Referring to FIG. 5, the enclosure 50 houses a local power supply 53, including a rechargeable battery, which power supply may be configured to harvest solar energy in known manner. The corridor node 22 further comprises a first part 22.1 and a second part 22.2 which, in this example embodiment, are mounted back to back. The first part 22.1 comprises at least one of a first WI-FI transceiver 54 and a first LTE transceiver 56 which are connected to WI-FI antenna 58 and LTE antenna 60 respectively for generating, in this example embodiment and as illustrated in FIG. 1, the first lobe 30 and the second lobe 32. The second part 22.2 comprises at least one of a second WI-FI transceiver 62 and a second LTE transceiver 64 which are connected to WI-FI antenna 66 and LTE antenna 68 respectively, for generating the third lobe 34 and the fourth lobe 36. The corridor node further comprises microwave link parts comprising a microwave transceiver 70 and microwave antennas 72 and 74, which will be referred to in further detail below.

Each house, such as house 14.19 in FIG. 2, may be fitted with a suitable directional antenna 76 for cooperating with the corridor node 22. The antenna is connected in known manner to a router 78 and other known electronic equipment in the house, to facilitate data communication between the equipment and the corridor node in known manner. The directional antennas on the user stations may play an important role in the successful operation of the system, since their directional patterns ensure high signal levels at the corridor nodes which they are associated with, whilst minimising interfering radiation to other user stations serviced by the same or other corridor nodes as well as minimising interference to adjacent corridor nodes and user stations, even when all of these operate within the same frequency band. For example, the furthest user station 14.46 serviced by corridor node 22 is close to the furthest user station 14.45 serviced by adjacent corridor node 24, but since user station 14.46 has a lobe pointing towards corridor node 22 and user station 14.45 has a lobe pointing nearly in the opposite direction, the signal from either corridor node 24 or user station 14.45 should have minimal effect on the signal received by user station 14.46 and vice versa.

Figure 6:
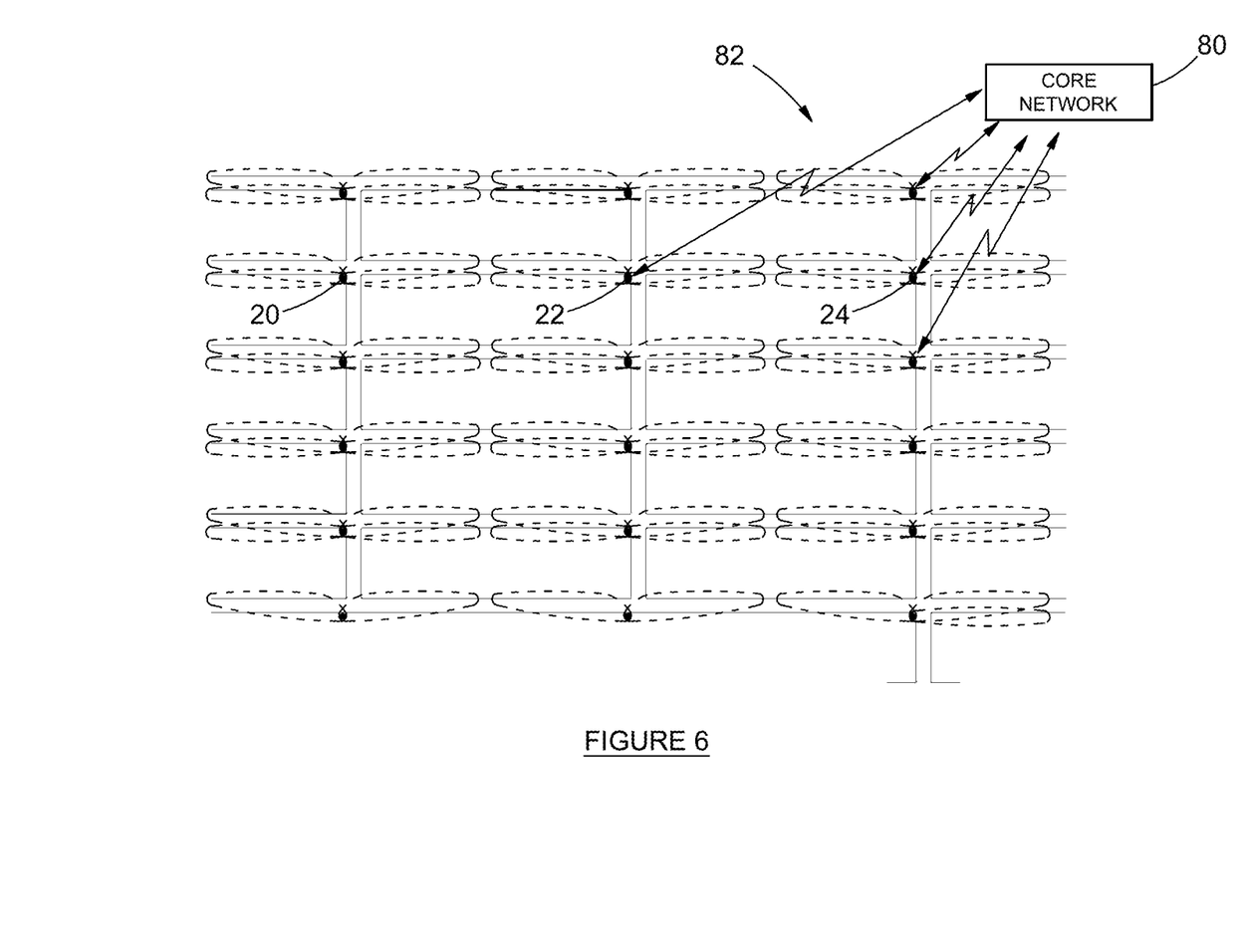
FIG. 6 illustrates the system and its connection to a core network via a backhaul network.

Referring to FIG. 6, the corridor nodes 22, 24 and 26 are connected in known manner to a core network 80 by a backhaul network 82, to be in bidirectional data communication with the core network. The backhaul network 82 may comprise any suitable infrastructure, such as fibre cables, wireless links, including microwave links, of which the above microwave transceiver 70 (shown in FIG. 5) of corridor node 22 and microwave antennas 72 and 74 (also shown in FIG. 5) may form part.

Figure 3:
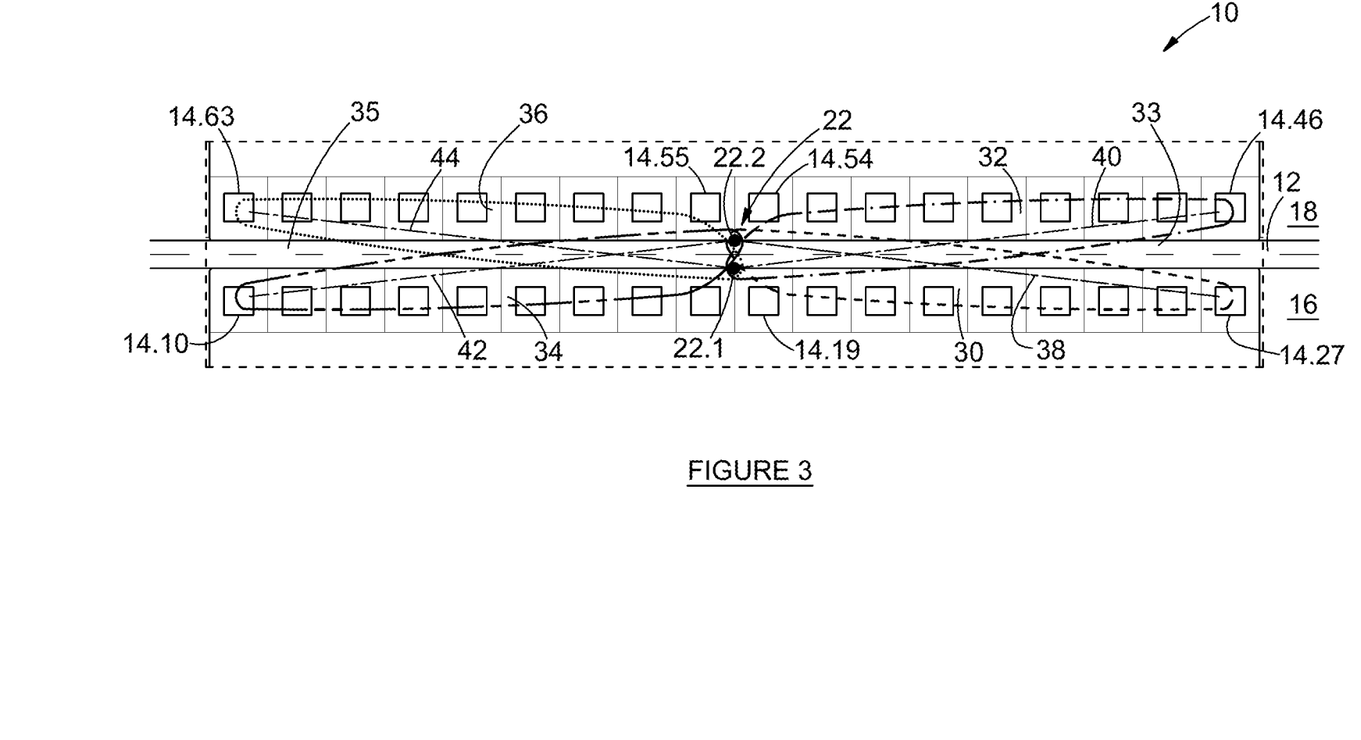
FIG. 3 is a second example embodiment of the system.

In FIG. 3 there is shown part of a second and presently preferred example embodiment of the system 10 for providing communication services to a plurality of user stations along a corridor or street 12. Although, for the sake of better clarity, only corridor node 22 is shown in FIG. 3, the embodiment of FIG. 3 is substantially similar to that of FIG. 1, except that the first part 22.1 of the corridor node is located on the first side 16 of the street 12 and the second part 22.2 on the opposite side 18 of the street. In the example embodiment, the first and second parts are mounted directly opposite one another.

In this example embodiment, the first part 22.1 generates the second lobe 32 having main axis 40 which is directed in the first direction A along the street towards region 14.46 on the second side 18 of the street intermediate the second corridor node 22 and third corridor node 24 and the fourth lobe 36 having main axis 44 which is directed in the opposite direction B along the street towards region 14.63 on the second side 18 of the street intermediate the first corridor node 20 and the second corridor node 22. The second part 22.2 generates the first lobe 30 having main axis 38 which is directed in the first direction A along the street towards region 14.27 on the first side 16 of the street intermediate the second corridor node 22 and third corridor node 24 and the third lobe 34 having main axis 42 which is directed in the opposite direction B along the street towards region 14.10 on the first side 16 of the street intermediate the first corridor node 20 and the second corridor node 22.

In a preferred embodiment part 22.1 and part 22.2 may each comprise a separate transceiver which is connected to drive the respective two lobes associated therewith and where the transceivers operate in the same frequency band while limiting interference using the pattern lobes and directional user station antennas. Each of part 22.1 and part 22.2 may also comprise two transceivers where each transceiver is coupled to an input generating one of the two lobes to further increase capacity within that node at the same or different frequency to the other node transceivers.

Figure 4:
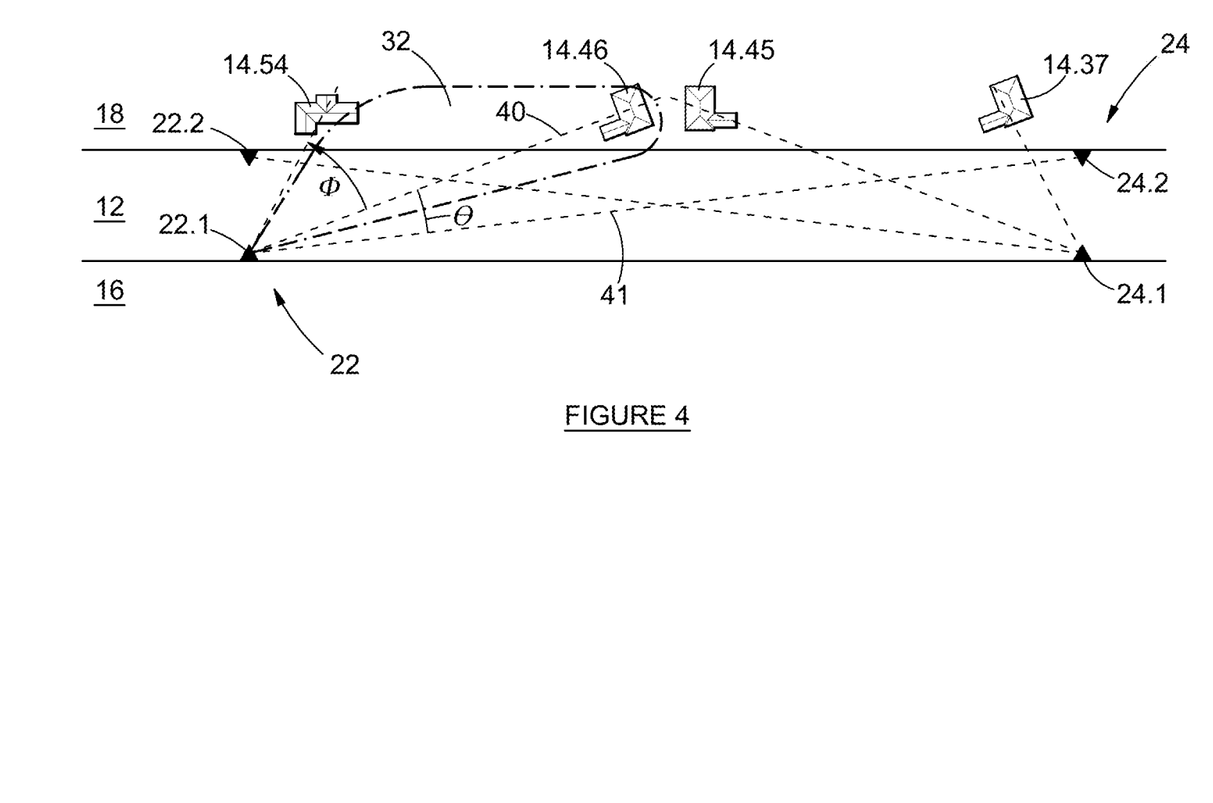
FIG. 4 is a basic diagram indicating relevant axes of radiation patterns of the corridor node and an example of their alignment relative to the houses and neighbouring corridor nodes.

Referring to FIG. 4, and taking the first part 22.1 of corridor node 22 as example, the gain of lobe 32 is a maximum on main axis 40 and decreases progressively in an anticlockwise direction through angle $\phi$, so that the signal strength at house 14.46 furthest away from part 22.1 is substantially equal to the signal strength at house 14.54 closest to the first part 22.1 and at all other houses on the opposite side 18 of the street serviced by lobe 32. As indicated, the lobe 32 may be asymmetrical relative to the main axis 40. The angle θ between the main axis 40 and a line 41 between first part 22.1 on first side 16 of the street and the second part 24.2 of corridor node 24 on the other side 18 of the street 12 will be referred to below.

Hence, as shown in FIGS. 3 and 4, the corridor node parts may be mounted on opposite sides of the corridor and are in communication with each other. In the case of the second corridor node 22, the first part 22.1 is located on the first side 16 and the second part 22.2 is located on the other side 18 of the street. The first part 22.1 generates second lobe 32 and fourth lobe 36 which are shaped as aforesaid to cover or serve houses on the opposite side 18. The second part 22.2 generates first lobe 30 and third lobe 34 which are shaped as aforesaid to cover or serve houses on the first side 16 of the street. Viewing the patterns of the split corridor nodes collectively, this again provides an overall pattern with four lobes. However, the angle θ between the main axis 40 and the line 41 between first part 22.1 of the corridor node 22 and the second part 24.2 of the corridor node 24 across the street 12 is maximized. Maximising this angle may be required, since the gain needs to be highest towards the furthest building and then lower or a null towards the neighbouring part and this may be easier to achieve, if θ is large. With the two parts located as far apart as practical across a corridor and with each providing coverage to the houses or buildings opposite the corridor from itself, improved angular separation between the main axes and the line to the adjacent corridor node part is achieved. Split parts providing coverage to houses on the opposite side also ensures that the radio waves travel maximum distance across the corridor and since corridors are substantially free of obstacles (trees, walls etc) the waves should encounter less obstacles.

Figure 7:
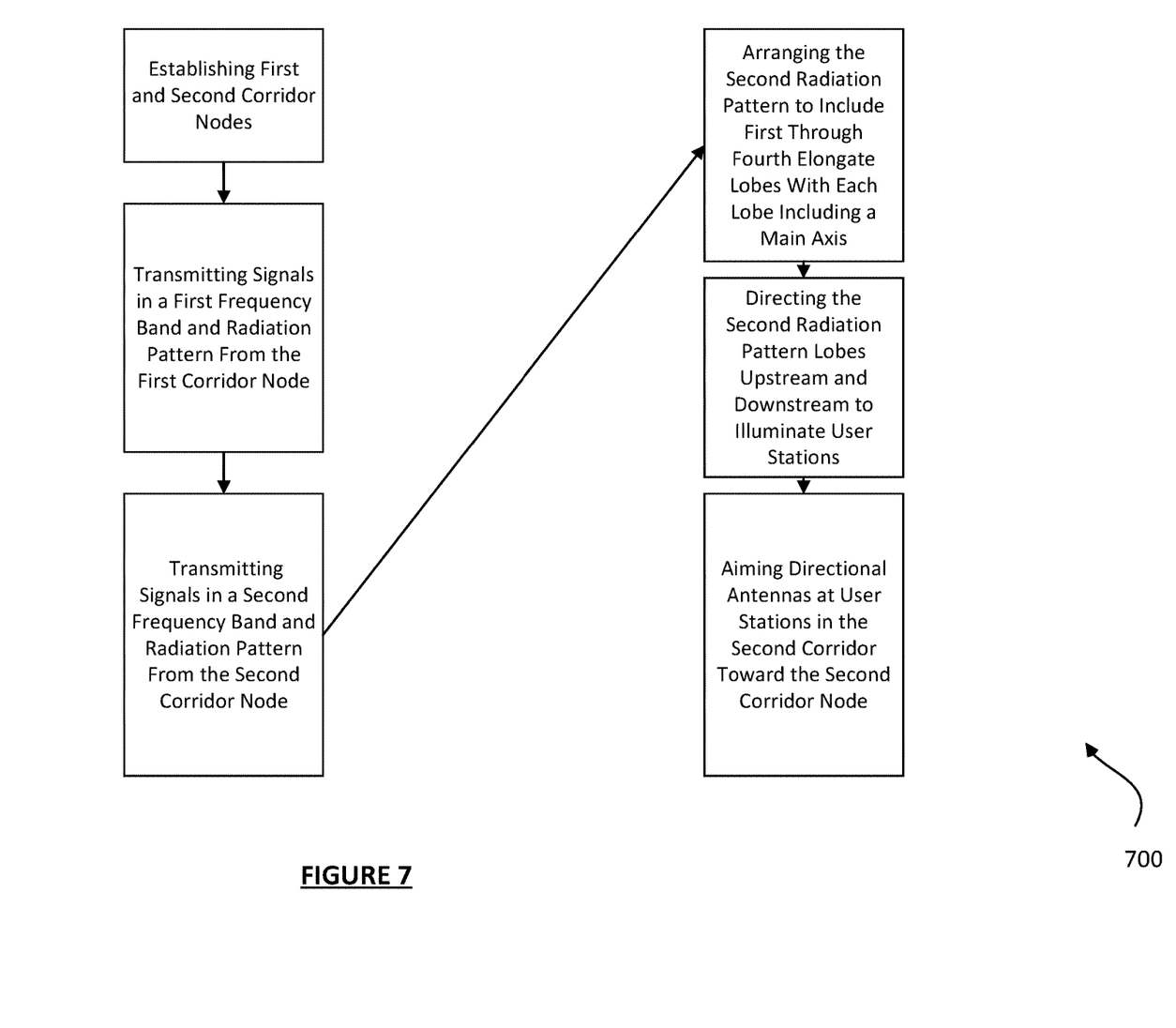
FIG. 7 is a flow chart of one embodiment method in which the principles of the present invention may be practiced.

Turning now to FIG. 7, there is illustrated at 700 a representative method by which the principles of the present invention may be practiced.

An alternative configuration more suitable to corridor node parts which are housed in a common enclosure is for one node transceiver to drive both pattern lobes in direction of A and another node transceiver to drive both lobes in direction of B, so that each node part transceiver user stations on both sides as opposed to the above embodiment where each transceiver covers one side of the corridor.

The invention claimed is:

1. A system for providing communication services to user stations which are spaced on each of a first side and a second opposed side of an elongate corridor extending between an upstream region and a downstream region, the system comprising:
   at least a first corridor node and a second corridor node provided in spaced relation along the corridor;
      the first corridor node comprising at least a first radio transceiver which is connected to a first antenna arrangement, the first radio transceiver transmitting radio signals in a first frequency band, the first antenna arrangement having a first radiation pattern;
      the second corridor node comprising at least a second radio transceiver which is connected to a second antenna arrangement, the second radio transceiver transmitting radio signals in a second frequency band, the second antenna arrangement having a second radiation pattern comprising at least a first elongate lobe having a main axis, a second elongate lobe having a main axis, a third elongate lobe having a main axis and a fourth elongate lobe having a main axis; the first frequency band and the second frequency band are at least partially overlapping;
   the second antenna arrangement being configured such that in respect of the second radiation pattern: the main axis of the first elongate lobe is directed upstream towards a first region along the corridor which is on the first side of the corridor to illuminate user stations associated with the second corridor node between the first region and the second corridor node; the main axis of the second elongate lobe is directed upstream towards a second region along the corridor which is on the second side of the corridor to illuminate user stations associated with the second corridor node between the second region and the second corridor node; the main axis of the third elongate lobe is directed towards a third region along the corridor which is on the first side of the corridor intermediate the first and second corridor nodes to illuminate user stations associated with the second corridor node between the third region and the second corridor node; and the main axis of the fourth elongate lobe is directed towards a fourth region along the corridor which is on the second side of the corridor intermediate the first and second corridor nodes to illuminate user stations associated with the second corridor node between the fourth region and the second corridor node; and
   a directional antenna at each user station associated with the second corridor node and which directional antenna is aimed at the second corridor node.

2. The system as claimed in claim 1 comprising at least the first corridor node, the second corridor node and a third corridor node provided sequentially in spaced relation along the corridor and wherein the first and second regions are intermediate the second and third corridor nodes.

3. The system as claimed in claim 1 wherein the first elongate lobe illuminates user stations on the first side of the corridor and is shaped such that gain is a maximum on the main axis of the first elongate lobe and decreases progressively in a first angular direction, the second elongate lobe illuminates user stations on the second side of the corridor and is shaped such that gain is a maximum on the main axis of the second elongate lobe and decreases progressively in an opposite angular direction, the third elongate lobe illuminates user stations on the first side of the corridor and is shaped such that gain is a maximum on the main axis of the third elongate lobe and decreases progressively in the opposite angular direction and the fourth elongate lobe illuminates user stations on the second side of the corridor and is shaped such that gain is a maximum on the main axis of the fourth elongate lobe and decreases progressively in the first angular direction.

4. The system as claimed in claim 1 wherein at least one of the first elongate lobe, the second elongate lobe, the third elongate lobe and the fourth elongate lobe is asymmetrical about its main axis.

5. The system as claimed in claim 2 wherein the first elongate lobe, the second elongate lobe, the third elongate lobe and the fourth elongate lobes of the second radiation pattern are shaped such that there are a first at least partial null between the first and second elongate lobes and a second at least partial null between the third and fourth elongate lobes, wherein the first at least partial null is directed at the third corridor node and wherein the second at least partial null is directed at the first corridor node.

6. The system as claimed in claim 1 wherein the second corridor node comprises a first part comprising a first part radio transceiver connected to an associated first part antenna arrangement and a second part comprising a second part radio transceiver connected to an associated second part antenna arrangement.

7. The system as claimed in claim 6 wherein the first part radio transceiver and the second part radio transceiver are housed in a common enclosure, wherein the first part of the second corridor node drives the first and second elongate lobes with signals in the second frequency band and wherein the second part of the second corridor node drives the third and fourth elongate lobes with signals in the second frequency band.

8. The system as claimed in claim 6 wherein the first part of the second corridor node and the second part of the second corridor node are split, wherein the first part of the second corridor node is mounted on the first side of the corridor and drives the second and fourth elongate lobes and wherein the second part of the second corridor node is mounted on the second side of the corridor and drives the first and third elongate lobes.

9. The system as claimed in claim 8 wherein the first part of the second corridor node and the second part of the second corridor node are mounted directly opposite one another.

10. A method of providing communication services to user stations which are spaced on each of a first side and a second opposed side of an elongate corridor extending between an upstream region and a downstream region, the method comprising:

using at least a first corridor node and a second corridor node provided in spaced relation along the corridor;

the first corridor node comprising at least a first radio transceiver which is connected to a first antenna arrangement, the first radio transceiver transmitting radio signals in a first frequency band, the first antenna arrangement having a first radiation pattern;

the second corridor node comprising at least a second radio transceiver which is connected to a second antenna arrangement, the second radio transceiver transmitting radio signals in a second frequency band, the second antenna arrangement having a second radiation pattern comprising at least a first elongate lobe having a main axis, a second elongate lobe having a main axis, a third elongate lobe having a main axis and a fourth elongate lobe having a main axis; the first frequency band and the second frequency band are at least partially overlapping;

directing the second radiation pattern such that: the main axis of the first elongate lobe is directed upstream towards a first region along the corridor which is on the first side of the corridor to illuminate user stations associated with the second corridor node between the first region and the second corridor node; the main axis of the second elongate lobe is directed upstream towards a second region along the corridor which is on the second side of the corridor to illuminate user stations associated with the second corridor node between the second region and the second corridor node; the main axis of the third elongate lobe is directed downstream towards a third region along the corridor which is on the first side of the corridor intermediate the first and second corridor nodes to illuminate user stations associated with the second corridor node between the third region and the second corridor node; and the main axis of the fourth elongate lobe is directed downstream towards a fourth region along the corridor which is on the second side of the corridor intermediate the first and second corridor nodes to illuminate user stations associated with the second corridor node between the fourth region and the second corridor node; and at each user station associated with the second corridor node, utilizing a directional antenna which is aimed at the second corridor node, to communicate with the second corridor node.

\* \* \* \* \*